(12) United States Patent
Kim et al.

(10) Patent No.: US 7,587,098 B2
(45) Date of Patent: Sep. 8, 2009

(54) PIXEL DATA GENERATING METHOD

(75) Inventors: Changsung Kim, Cerritos, CA (US);
Hsuan-Huei Shih, Taipei (TW);
Chung-Chieh Kuo, Arcadia, CA (US);
Chia-Hung Yeh, Tainan (TW)

(73) Assignee: MAVs Lab. Inc., Tau-Yuan (TW)

( * ) Notice: Subject to any disclaimer, the term of this patent is extended or adjusted under 35 U.S.C. 154(b) by 650 days.

(21) Appl. No.: 11/181,500

(22) Filed: Jul. 14, 2005

(65) Prior Publication Data

US 2007/0014482 A1    Jan. 18, 2007

(51) Int. Cl.
*G06K 9/42* (2006.01)
(52) U.S. Cl. ............................ 382/256; 382/254
(58) Field of Classification Search ............ 382/256; 348/409, 420, 607
See application file for complete search history.

(56) References Cited

U.S. PATENT DOCUMENTS

| | | | | |
|---|---|---|---|---|
| 5,396,625 A * | 3/1995 | Parkes | ............................ | 707/1 |
| 5,751,361 A * | 5/1998 | Kim | ...................... | 375/240.12 |
| 5,841,477 A * | 11/1998 | Kim | ...................... | 375/240.24 |
| 5,875,040 A * | 2/1999 | Matraszek et al. | ........... | 358/453 |
| 6,532,467 B1 * | 3/2003 | Brocklebank et al. | ........ | 707/100 |
| 6,892,343 B2 * | 5/2005 | Sayood et al. | .............. | 714/779 |
| 6,993,075 B2 * | 1/2006 | Kim et al. | ............... | 375/240.12 |
| 7,042,948 B2 * | 5/2006 | Kim et al. | ............... | 375/240.25 |
| 7,136,541 B2 * | 11/2006 | Zhang et al. | ................. | 382/300 |
| 7,313,285 B2 * | 12/2007 | Aliaga et al. | ................. | 382/243 |
| 2004/0076343 A1 * | 4/2004 | Zhang et al. | ................. | 382/300 |
| 2004/0193632 A1 * | 9/2004 | McCool et al. | ............. | 707/101 |
| 2007/0189615 A1 * | 8/2007 | Liu et al. | ..................... | 382/232 |
| 2008/0069452 A1 * | 3/2008 | Matsumoto | ................. | 382/207 |

FOREIGN PATENT DOCUMENTS

| | | |
|---|---|---|
| CN | 1159122 A | 9/1997 |
| CN | 1106767 C | 4/2003 |

OTHER PUBLICATIONS

Sun et al., Concealment of Damaged Block Transform Coded Images Using Projections onto Convex Sets, IEEE Transactions on Image Processing, vol. 4. No. 4. .Apr. 1995, p. 470-477.*

(Continued)

*Primary Examiner*—Brian Q Le
*Assistant Examiner*—Mekonen Bekele
(74) *Attorney, Agent, or Firm*—Quintero Law Office

(57) ABSTRACT

A method of generating pixel data of a missing block in an image frame is disclosed. Edge points are detected from neighboring image side adjacent to the missing block. A direction is calculated for each edge point. Edge lines are formed from edge points based on the direction thereof to partition the missing block into a plurality of missing regions. Data for missing pixels in each missing region are then calculated using reference pixels from neighboring image sides adjacent to the missing region.

22 Claims, 8 Drawing Sheets

OTHER PUBLICATIONS

Kung et al., "A Spatial-Domain Error Concealment Method With Edge Recovery and Selective Directional Interpolation", 2003 IEEE, p. V-700-703.*

Shih-Chang Hsia, "An Edge-Oriented Spatial Interpolation for Consecutive Block Error Concealment" IEEE Signal Processing Letters, vol. 11, No. 6, Jun. 2004, pp. 577-580.*

Zeng te al., "Geometric-Structure-Based Error Concealment with Novel Applications in Block-Based Low-Bit-Rate Coding" IEEE Transactions on Circuits and Systems for Video Technology, vol. 9, No. 4, Jun. 1999, p. 648-665.*

Song Cen and Pamela C. Cosman, "Decision Trees for Error Concealment in Video Decoding" IEEE Transactions on Multimedia, vol. 5, No. 1, Mar. 2003, pp. 1-7.*

Huifang Sun, et al. "Concealment of Damaged Block Transform Coded Images Using Projections onto Convex Sets", IEEE Transactions on Image Processing vol. 4, No. 4, Apr. 30, 1995, pp. 470-475, US.

Wei-Ying Kung, et al. "A Spatial-Domain Error Concealment Method with Edge Recovery and Selective Directional Interpolation", ICASSP, Dec. 31, 2003, 4 Pages, US.

* cited by examiner

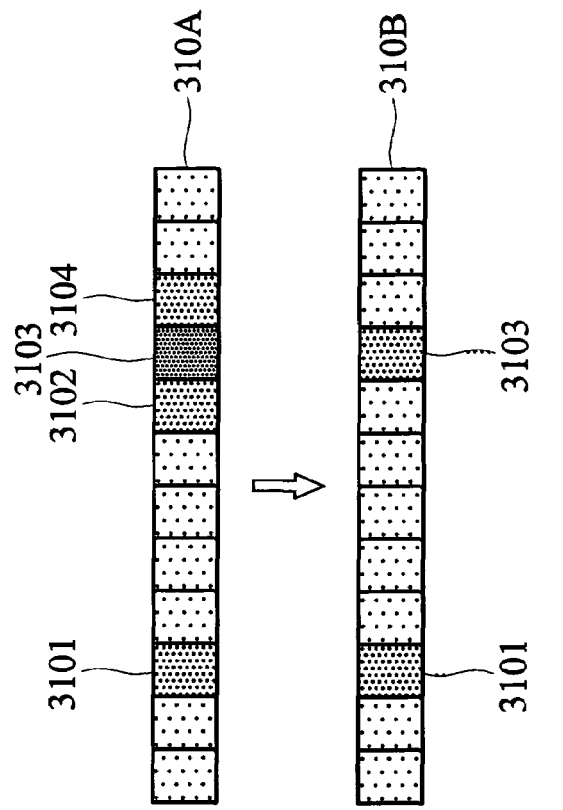
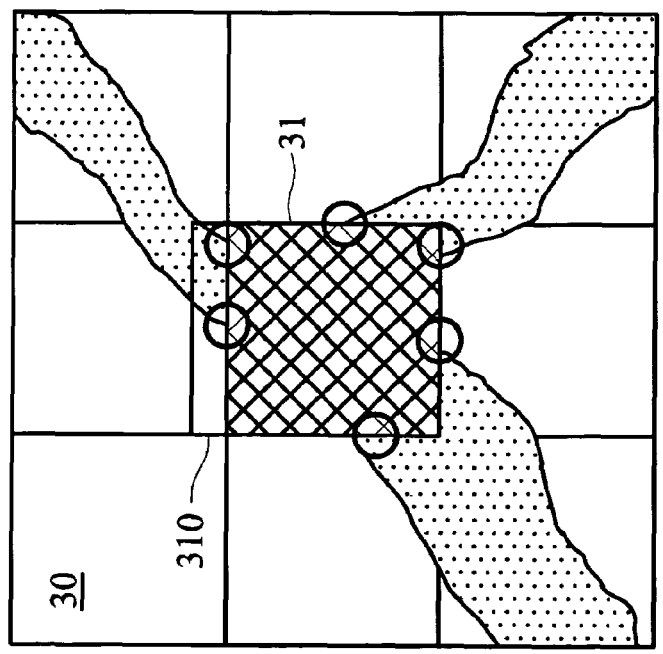
FIG. 3C
FIG. 3B

PIXEL DATA GENERATING METHOD

BACKGROUND

The invention is related to an image processing method, and more particularly, to methods generating pixel data for a missing block in an image frame.

FIG. 1 shows a conventional method of generating a missing block pixel matrix 12 in an image frame 10. The surrounding reference pixels 111, 112, 113 and 114 could easily acquired for a missing pixel 121 of the missing block pixel matrix 12. These reference pixels 111, 112, 113 and 114 can be generated by finding pixels with matching vertical or horizontal position, on the neighboring image boundary 11 adjacent to missing block 12. A reference pixel contributes the recovery of missing data depending on distance from the missing pixel. Combining contributions from all reference pixels regenerates a missing pixel data. The missing block is a linear color gradient filling of the neighboring image boundary, vertically and horizontally.

For images with non-vertical or non-horizontal patterns, the conventional method cannot efficiently regenerate missing block data with satisfaction. FIG. 2A shows an image before a block is lost. FIG. 2B shows a resulting image generated by the conventional method from the image of FIG. 2A. The patterns of the image are cut vertically and horizontally. It is necessary to have a method that can regenerate patterns of images.

SUMMARY

A method of generating pixel data of a missing block in an image frame is disclosed. Edge points are detected from neighboring image sides adjacent to the missing block. A direction is calculated for each edge point. Edge lines are formed from edge points based on the direction thereof to partition the missing block into a plurality of missing regions. Data for missing pixels in each missing region are then calculated using reference pixels from neighboring image sides that adjacent to the missing region.

DESCRIPTION OF THE DRAWINGS

The accompanying drawings incorporated in and constitute a part of this specification, illustrate embodiments of the invention and, together with the description, serve to explain the features, advantages, and principles of the invention.

FIG. 3B~3H illustrate the method shown in FIG. 3A.

DETAILED DESCRIPTION

Patterns in images are distinguished by color change. Edges are formed between colors, and outline the patterns. By detecting edges from neighboring images of a missing block and extending edges into the missing block, patterns of an image can be rebuilt.

Figure 1:
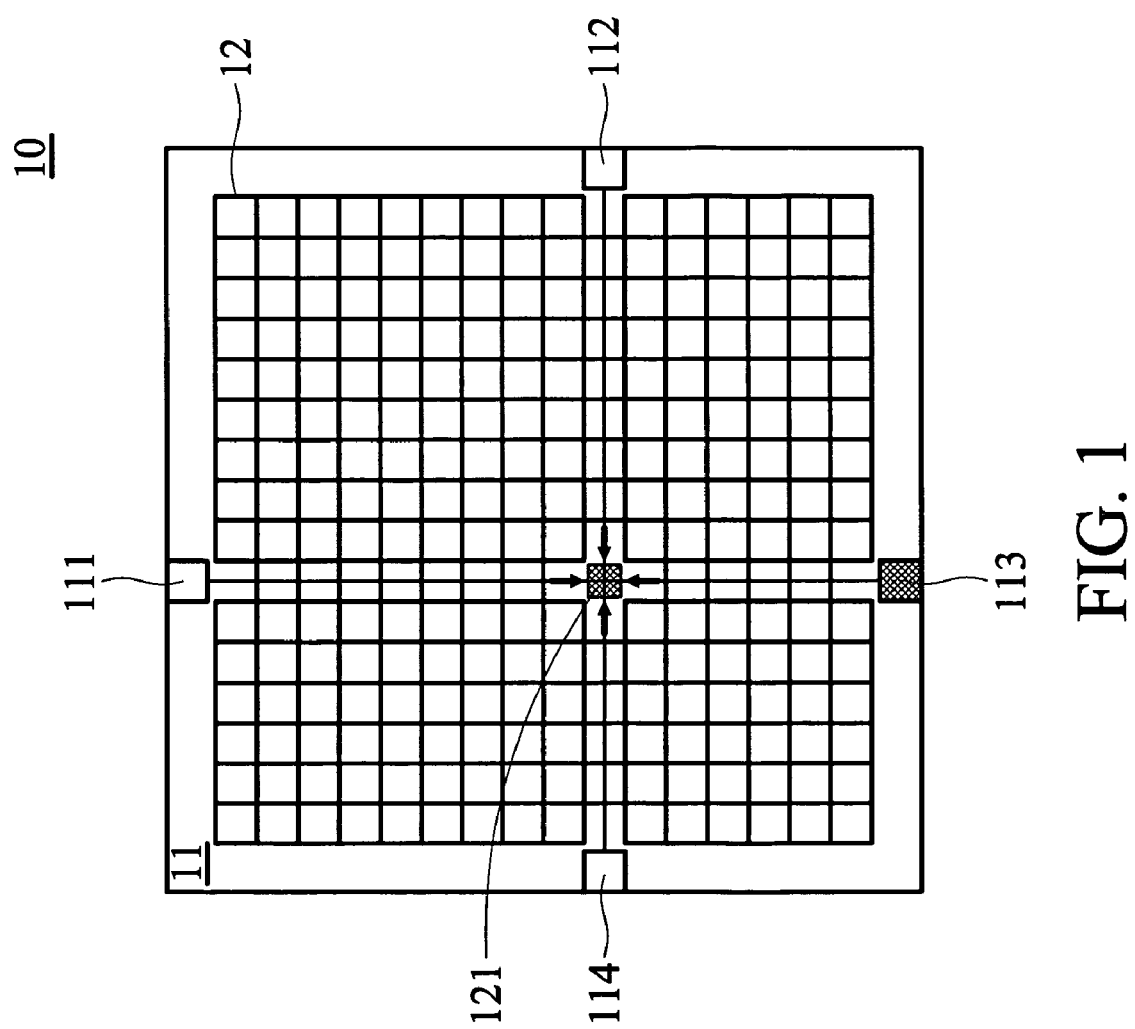
FIG. 1 shows a conventional method of generating a missing block pixel matrix 12 in an image frame 10.
Figure 2B:
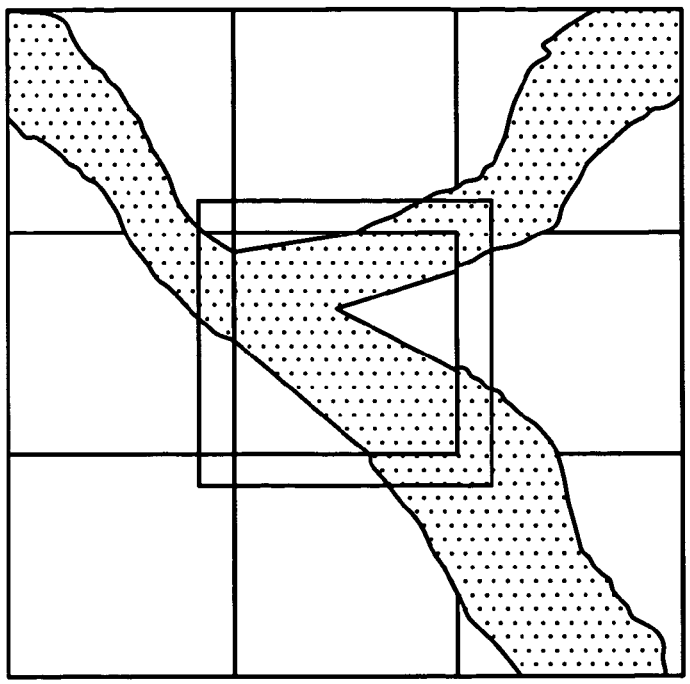
FIG. 2B shows a resulting image generated by the conventional method from the image of FIG. 2A.
Figure 2A:
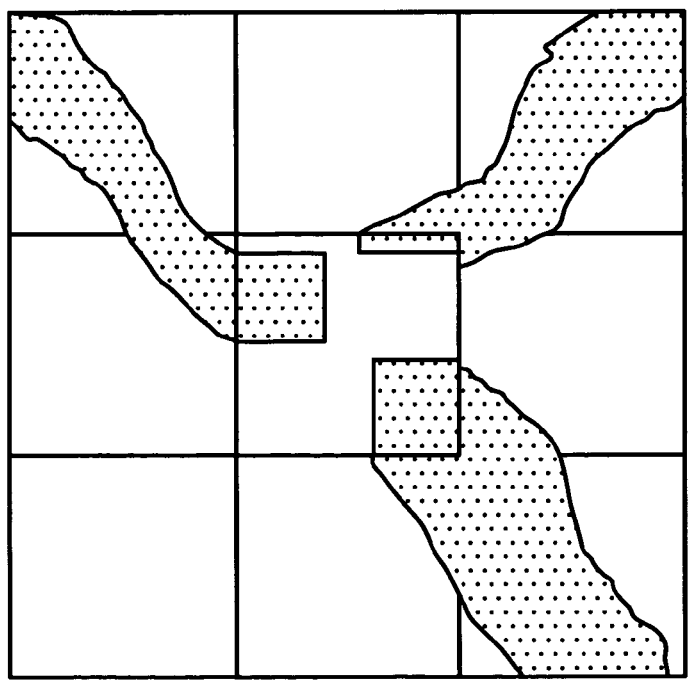
FIG. 2A shows an image before a block is lost.
Figure 3A:
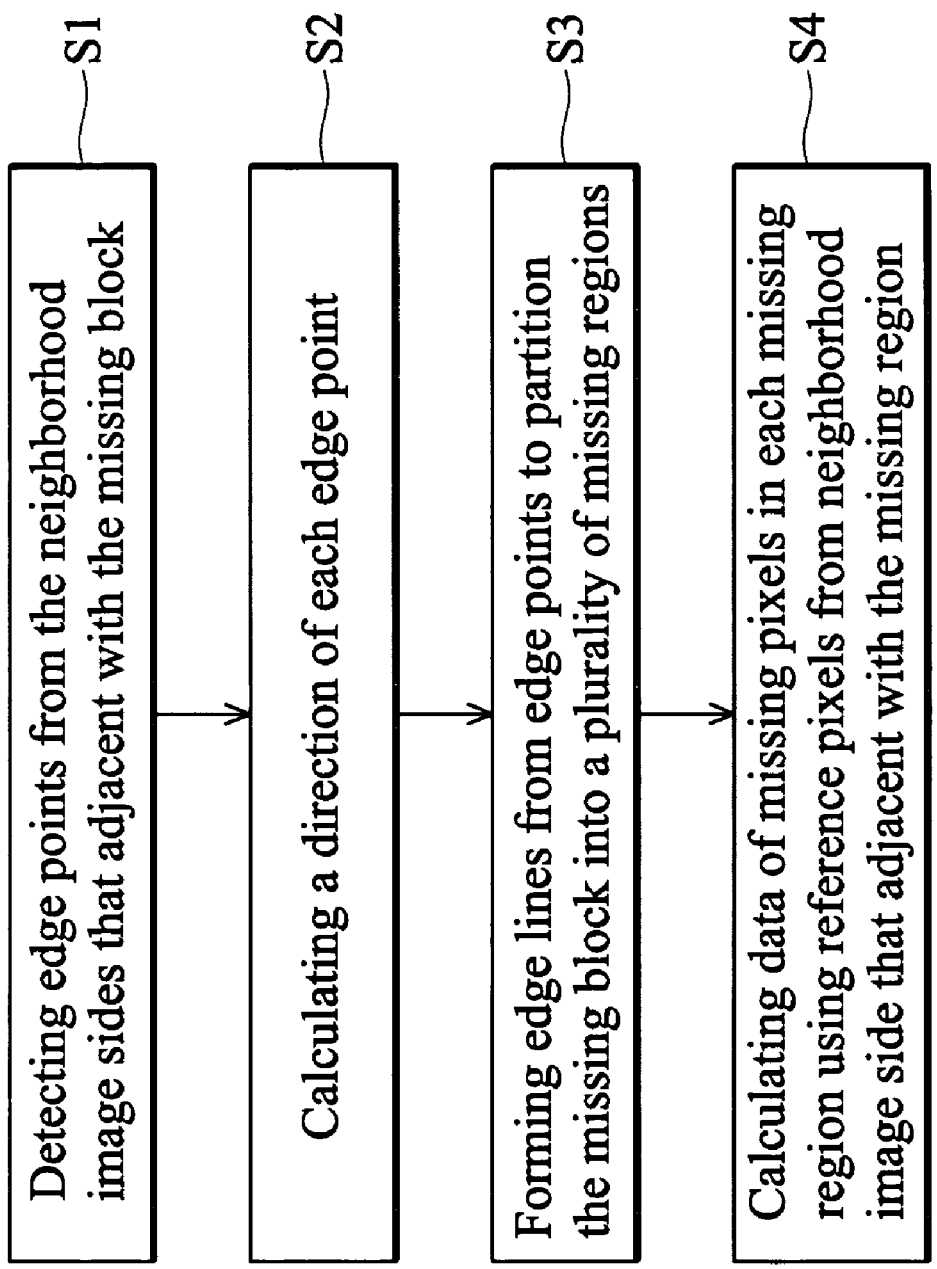
FIG. 3A is a flow chart of a method according to an embodiment of the invention.

FIG. 3A is a flow chart of a method according to an embodiment of the invention. First, edge points are detected from the neighboring image sides adjacent to the missing block (Step S1). Second, a direction is calculated for each edge point (Step S2). Third, edge lines are formed from edge points based on the direction thereof to partition the missing block into a plurality of missing regions (Step S3). Data of missing pixels in each missing region is then calculated using reference pixels from neighboring image sides adjacent to the missing region (Step S4).

FIG. 3B shows an image 30 with missing block 31. Edge points are detected from the neighboring image side adjacent to the missing block according to Step S1 of FIG. 3A. FIG. 3C illustrates steps of edge point detection from side 310 of FIG. 3B. Illustration 310A shows edge points 3101, 3102, 3103 and 3104 detected from side 310, when the adjacent pixel difference exceeds maximum of 2*MAD (mean absolute difference) and QP/2 such as;

$$|x_i - x_{i-1}| > \max\left(\frac{2}{N} \cdot \sum_{k=1}^{N} |x_i - x_{i-1}|, \frac{QP}{2}\right)$$

Wherein $X_i$ is pixel data and QP is a quantization parameter associated with the image frame.

In general, multiple edge points are detected around a true edge except sharp step edges, such as edge points 3102, 3103 and 3104 detected for just one real edge. In order to determine a true single edge point, edge thinning is performed such that one edge point with maximum edge magnitude is chosen. Illustration 310B shows edge point 3103 chosen to represent a real edge point.

Figure 3E:
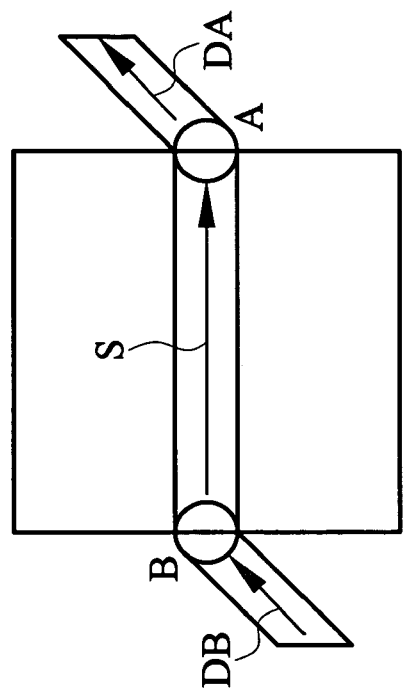
Figure 3D:
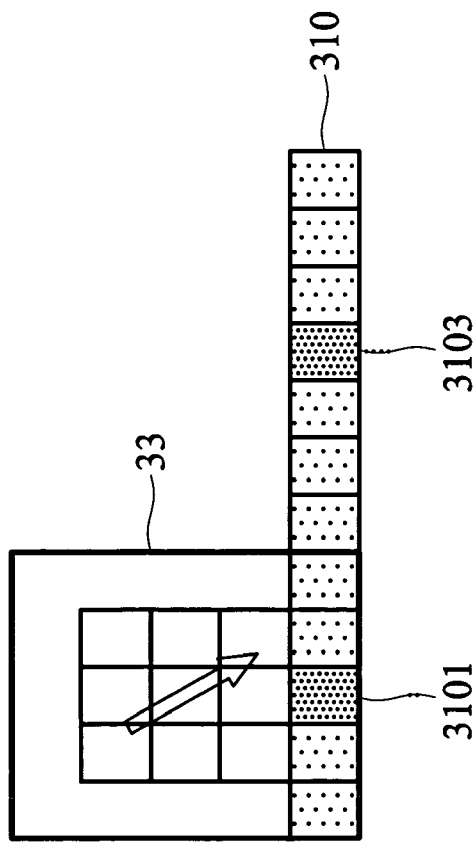

FIG. 3D shows a k*k pixel matrix 33, where k is odd number between 1 and 16, and k is chosen as 5 in this embodiment, containing the edge point 3101 chosen for direction calculation according to step 2 of FIG. 3A. 3*3 Sobel Filter is chosen in this embodiment to calculate the direction of the edge point. Calculating row and column gradients, $G_R(n)$ and $G_C(n)$, of the k*k pixel matrix using 3*3 Sobel Filter results (k-2)*(k-2) set of $G_R(n)$ and $G_C(n)$. Edge angles and magnitudes can then be calculated from the $G_R(n)$ & $G_C(n)$. For example, an edge angle can be calculated as $$\tan^{-1}\left(\frac{G_R(n)}{G_C(n)}\right),$$

and an edge magnitude can be calculated as $\sqrt{(G_R(n))^2 + (G_C(n))^2}$. An edge angle is increased by $\pi$ when the edge angle is lower than zero, making the edge angle positive. An average edge angle and magnitude of k*k pixel matrix are then calculated as the direction of the edge point. A set of edge angle and magnitude is discarded from calculating the average edge angle and magnitude when the edge magnitude is less than 2*MAD. Adaptive size of pixel matrix can provide more accurate edge direction property for the context adaptive edge points.

An image with complicated information contains many small color patterns. Edge points may be found for small patterns on the sides of the missing block. Connecting edge points of small patterns with compatible direction of edges but different colors may crumble the missing block image. An edge point with statistic lower than a statistic threshold, which is 30% in this embodiment, then can be discarded. The statistic is calculated by: quantizing the (k-2)*(k-2) edge angles and the average angle of k*k pixel matrix with a quantizing parameter $\pi/32$, accumulating edge magnitudes with corresponding quantized edge angle equals to the quantized average edge angle, and dividing the accumulated edge magnitudes by sum of all edge magnitudes. An edge magnitude lower than MAD will be discarded from statistic calculation. Low statistic of an edge point means the neighboring image has low edge angel consistency and should not be connected to other side of the missing block.

A method of forming edge lines from edge points based on the direction thereof to partition the missing block into a plurality of missing regions according to step S3 of FIG. 3A is described here. A linked edge line is defined for each pair of edge points with compatible directions, and an isolated edge line is defined from each unpaired edge point into the missing block along the direction of the unpaired edge point ending on a linked edge line.

A pair of edge points with compatible directions is chosen based on edge angles and magnitudes. All directions of edge points are normalized by dividing edge angles by Π and dividing edge magnitudes by a maximum storable value, such as 256 for an 8-bit image data system. Selecting edge point pairs with a normalized edge magnitude difference lower than 4*QP/N2 and normalized edge angle difference lower than Π/8 forms a linked edge line. Thresholds like 4*QP/N2 or Π/8 can be defined as other values to adapt to different image process requirements.

FIG. 3E shows a linked edge line formed by connecting edge point A and B according to an embodiment of the invention. The linked edge line has a slope S and the edge points A and B have directions DA and DB respectively. The linked edge line is formed due to DA and DB compatibility. However, if angle difference of slope S to DA or DB is significant, inconsistent data is generated in the missing block. An angle difference of slope S to DA and DB is calculated. If the angle difference exceeds a threshold 0.125*Π, the linked edge line is discarded and both edge points are deemed unpaired.

Figure 3F:
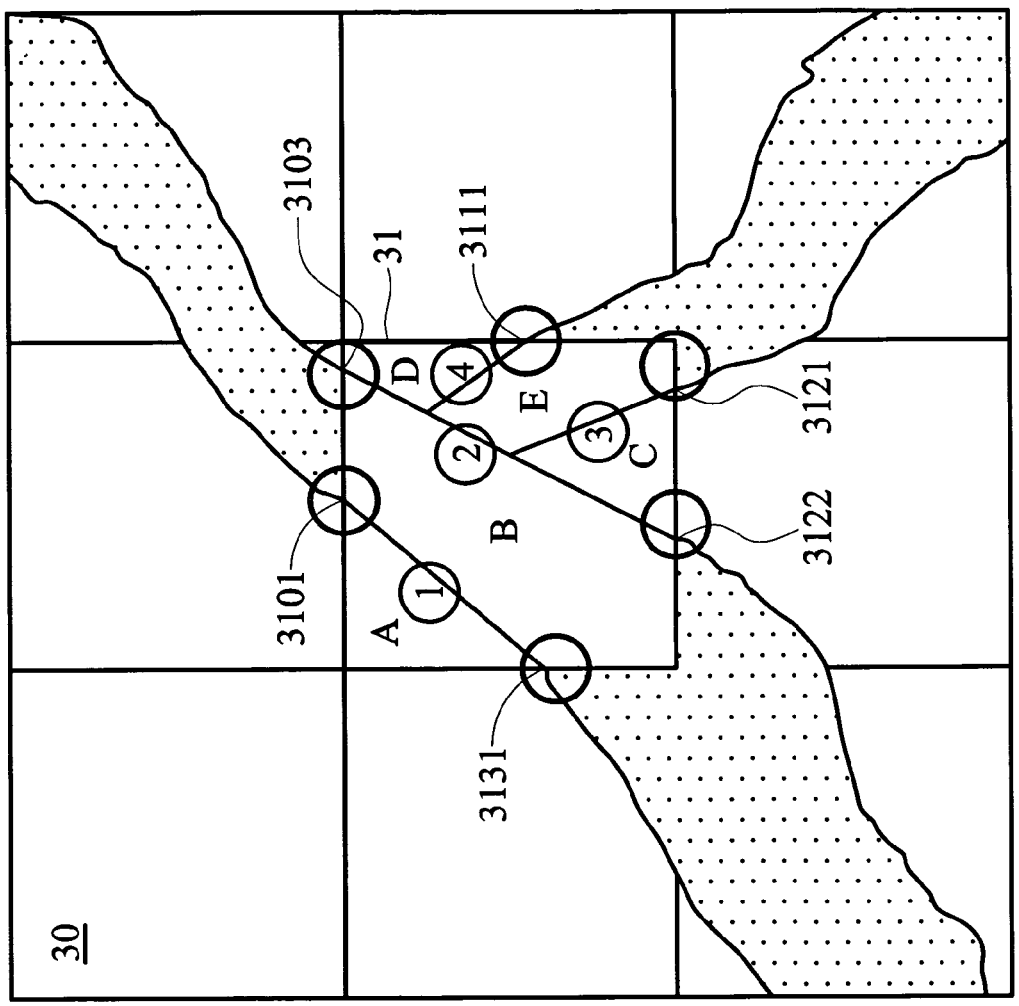

FIG. 3F shows detected edge points and formed edge lines for missing region 31 in image 30 of FIG. 3B according to an embodiment of the invention. Edge point pairs (3101, 3131) and (3103, 3122) form linked lines 1 and 2 respectively, and unpaired edge points 3111 and 3121 form the isolated edge lines 4 and 3 respectively. By treating the horizontal position as x and the vertical position as y and setting one corner of the missing block as (0, 0), a ax+by+c=0 function can represent each edge line.

Figure 3G:
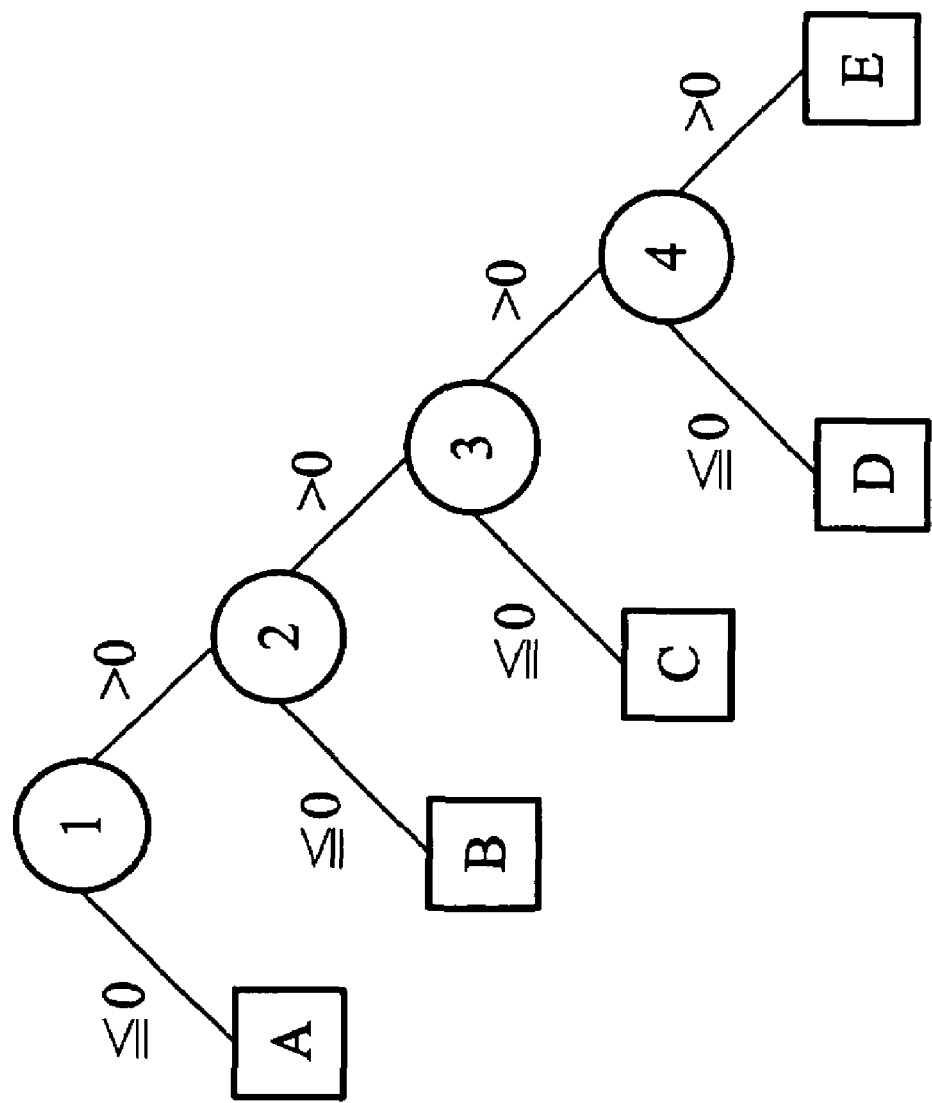

FIG. 3G shows a binary tree structure representing edge lines and edge regions of the missing block 31 of FIG. 3F. Nodes 1, 2, 3 and 4 are created to represent edge lines 1, 2, 3 and 4. Each node has a first branch to link a node in the positive region of the edge line (ax+by+c≧0) and a second branch to link a node in the negative region of the edge line (ax+by+c≦0). Linked nodes are connected first then isolated nodes. Unconnected branches A, B, C, D and E on the binary tree structure represent missing regions A, B, C, D and E, respectively.

A linked node of edge points with minimum of $\sqrt{(P_i-P_j)^2+\overline{\omega}_\theta \cdot (\theta_i-\theta_j)^2}$ can be chosen as a starting node of the binary tree structure; wherein $P_i$ and $P_j$ are normalized edge magnitudes of 2 edge points and $\theta_i$ and $\theta_j$ are normalized edge angles of the 2 edge points, and $\omega_\theta$ is a predetermined weight coefficient. $\omega_\theta=2$ is chosen to favor the edge angle contribution in this embodiment.

Figure 3H:
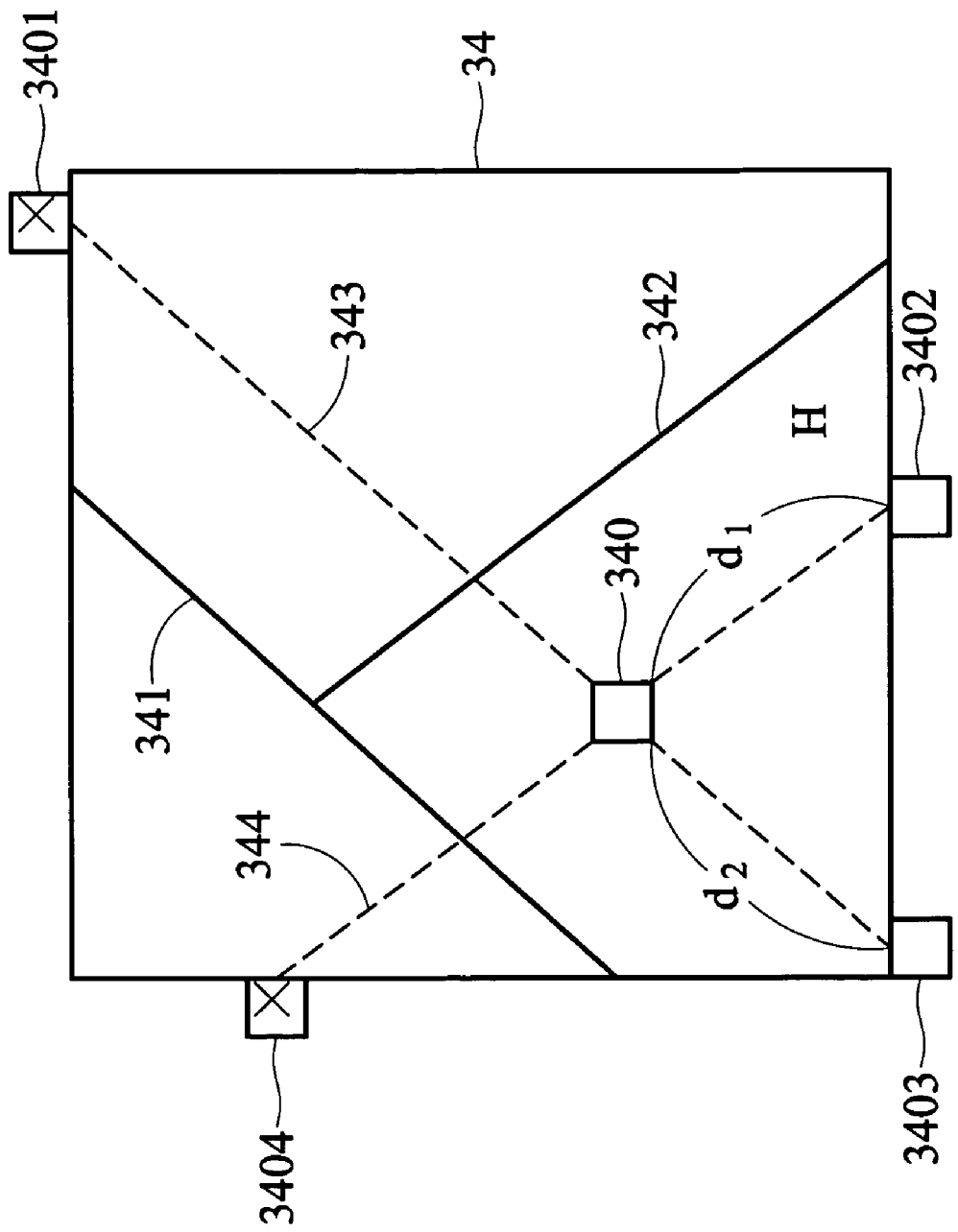

FIG. 3H shows a method of locating reference pixels from neighboring image sides adjacent to the missing region H for missing pixel 340, according to step S4 of FIG. 3A. Missing pixel 340 is located in the missing region associated to linked edge line 341 and isolated edge line 342. Virtual line functions are generated past missing pixel 340 with slopes the same as line 342 and 341, such as dashed lines 344 and 343 connecting neighboring image sides in pixels 3401, 3402, 3403 and 3404. Pixels 3401 and 3403 are discarded not being adjacent to the missing region H. Pixels 3402 and 3403 are then chosen as reference pixels. All missing pixels have different numbers of reference pixels on 4 sides.

Data of a missing pixel is then calculated as the sum of the contributions of each reference pixel, wherein the contribution of each reference pixel being the pixel data times a weight coefficient. Missing pixel data $\hat{x}_j$ can be calculated as:

$$\hat{x}_j = \sum_{i=1}^{N_j} a_i y_i,$$

$$a_i = \frac{1/d_i}{\sum 1/d_k}$$

Wherein $a_i$ is a weight coefficient equaling a normalized distance between the missing pixel and reference pixels.

The invention discloses methods of generating pixel data for a missing block in an image frame, providing smoothness and consistency applicable in macro-block lost error concealment in video communication or image manipulation. An unwanted block in an image can be deleted, and then regenerated using data from the neighborhood image by methods according to the invention.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A method of generating pixel data of a missing block in an image frame, comprising:

detecting edge points from neighboring image sides adjacent to the missing block;

calculating a direction of each edge point;

forming edge lines from edge points based on the directions thereof to partition the missing block into a plurality of missing regions, wherein the edge lines comprise a linked edge line defined by a pair of edge points with compatible directions and an isolated edge line defined by a direction of an unpaired edge point extending from the unpaired edge point into the missing block and ending on a linked edge line; and calculating data of missing pixels in each missing region using reference pixels from neighboring image sides adjacent to the missing region;

wherein definition of a linked edge line for each pair of edge points with compatible directions comprises:

normalizing all directions of edge points by dividing edge angles and edge magnitudes by values normalizing of edge angles and edge magnitudes with minimum value 0 and maximum 1, wherein the edge angles and magnitudes representing directions of an edge points; and selecting edge point pairs with Pi-Pj lower than an link magnitude threshold and θi-θj lower than an link angle threshold to form a linked edge line, where Pi and Pj are normalized edge magnitudes of 2 edge points and θi and θj are normalized edge angles of the 2 edge points.

2. The method as claimed in claim 1, wherein an edge point is detected when the adjacent pixel difference exceeds a threshold.

3. The method as claimed in claim 2, wherein the threshold is a maximum of 2*MAD (mean absolute difference) and QP/2, and QP is a quantization parameter associated with the image frame.

4. The method as claimed in claim 1, wherein an edge line is discarded when the angle difference between the slope of the edge line and the direction of associated edge points exceeds an angle threshold.

5. The method as claimed in claim 4, wherein the angle threshold is $0.125\pi$.

6. The method as claimed in claim 1 wherein the link angle threshold is $4*QP/N^2$, and the link magnitude threshold is $\pi/8$, N is the number of the edge points, and QP is a quantization parameter associated with the image frame.

7. The method as claimed in claim 1 further comprising:
creating a linked node representing each linked edge line, and an isolated node for each isolated edge line; wherein each linked or isolated node has a first and second branch linking to a node in positive and negative region of the node respectively;
sequentially linking the linked nodes to form a binary tree structure; wherein a linked node in positive or negative region of a former lined node connected to the first or second branch of the former linked node respectively;
sequentially connecting the isolated nodes to the linked nodes; the isolated nodes ends on the same linked node connected sequentially thereto; wherein an isolated node in positive or negative region of a former node connected to the first or second branch of the former node respectively; and
assigning each unconnected branch to identify a missing region.

8. The method as claimed in claim 7 further comprising:
normalizing all directions of edge points by dividing edge angles by $\pi$ and dividing edge magnitudes by a maximum storable value; wherein the edge angle and magnitude are vectors representing the direction of an edge point; and
choosing a linked node with a pair of edge points with minimum of $\sqrt{(P_i-P_j)^2+\overline{\omega}_\theta \cdot (\theta_i-\theta_j)^2}$ as a starting node of the binary tree structure, wherein $P_i$, and $P_j$ are normalized edge magnitudes of 2 edge points and $\theta_i$ and $\theta_j$, are normalized edge angles of the 2 edge points, and $\omega_\theta$ is a predetermined weight coefficient.

9. The method as claimed in claim 8, wherein the weight coefficient $\omega_\theta=2$.

10. The method as claimed in claim 1, wherein calculation of a direction of each edge point comprises:
choosing a k*k pixel matrix containing the edge point on one side, wherein k is a positive odd integer no less than 3;
calculating row and column gradients of the k*k pixel matrix using a 3*3 Sobel Filter;
calculating edge angles and magnitudes of the row and column gradients;
calculating an average edge angle and magnitude of all edge angles and magnitudes as a direction of the edge point.

11. The method as claimed in claim 10, wherein the edge angle equals $\tan^{-1}(G_R/G_C)$, where $G_R$ is the row gradient and $G_C$ is the column gradient.

12. The method as claimed in claim 11, wherein an edge angle is increased by $\pi$ when the edge angle is less than zero.

13. The method as claimed in claim 10, wherein the edge magnitude equals $\sqrt{(G_R)^2+(G_C)^2}$, where $G_R$ is the row gradient and $G_C$ is the column gradient.

14. The method as claimed in claim 10, wherein a set of edge angle and magnitude is excluded from calculations of the average edge angle and magnitude, when the edge magnitude is less than 2*MAD.

15. The method as claimed in claim 10, further comprising steps of excluding edge point with statistic lower than a statistic threshold; the statistic calculated by:
quantizing the edge angles and the average angle with a quantizing parameter;
accumulating edge magnitudes with corresponding quantized angle the same as the quantized average edge angle; and
dividing the accumulated edge magnitudes by the sum of all edge magnitudes.

16. The method as claimed in claim 15, wherein the statistic threshold is 30%.

17. The method as claimed in claim 15, wherein an edge magnitude lower than MAD is excluded from statistic calculation.

18. The method as claimed in claim 15, wherein the quantizing parameter is $\pi/32$.

19. The method as claimed in claim 1, wherein reference pixels for each missing pixel are obtained from neighboring image sides adjacent to the missing region by generating virtual line functions, passing the missing pixel with the same slopes as the associated edge lines, and crossing the neighborhood image side at the reference pixels.

20. The method as claimed in claim 19, wherein data of each missing pixel is the sum of the contributions of each reference pixel.

21. The method as claimed in claim 20, wherein the contribution of each reference pixel is the data of the reference pixel times a weight coefficient.

22. The method as claimed in claim 21, wherein the weight coefficient is a reciprocal of the distance of a reference pixel to the missing pixel, divided by the sum of reciprocal of the distance of each reference pixel to the missing pixel.

* * * * *